(12) United States Patent
Bruckner et al.

(10) Patent No.: US 9,518,481 B2
(45) Date of Patent: Dec. 13, 2016

(54) METHOD FOR OPERATING A RECIRCULATING WASTE HEAT STEAM GENERATOR

(75) Inventors: Jan Bruckner, Uttenreuth (DE); Martin Effert, Erlangen (DE); Frank Thomas, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 498 days.

(21) Appl. No.: 14/123,418

(22) PCT Filed: May 23, 2012

(86) PCT No.: PCT/EP2012/059575
§ 371 (c)(1),
(2), (4) Date: Dec. 2, 2013

(87) PCT Pub. No.: WO2012/168074
PCT Pub. Date: Dec. 13, 2012

(65) Prior Publication Data
US 2014/0109547 A1    Apr. 24, 2014

(30) Foreign Application Priority Data
Jun. 6, 2011    (DE) .................. 10 2011 076 968

(51) Int. Cl.
*F22D 5/26*    (2006.01)
*F01K 23/10*    (2006.01)
(Continued)

(52) U.S. Cl.
CPC ........... *F01K 23/108* (2013.01); *F01K 23/101* (2013.01); *F22B 1/1815* (2013.01); *F22B 35/02* (2013.01);
(Continued)

(58) Field of Classification Search
CPC .......... Y02E 20/14; Y02E 20/16; F01K 23/10; F01K 23/101; F02C 6/18; F22D 5/26
See application file for complete search history.

(56) References Cited

U.S. PATENT DOCUMENTS

| | | | |
|---|---|---|---|
| 4,242,989 A | | 1/1981 | Chamberlain |
| 5,529,021 A | * | 6/1996 | Butterlin ................ F22B 35/10 122/448.1 |

(Continued)

FOREIGN PATENT DOCUMENTS

| | | |
|---|---|---|
| CN | 2077950 U | 5/1991 |
| CN | 101984761 A | 3/2011 |

(Continued)

*Primary Examiner* — Justin Larson
(74) *Attorney, Agent, or Firm* — Beusse Wolter Sanks & Maire

(57) ABSTRACT

A method for operating a recirculating waste heat steam generator is provided, in which in a pressure stage of the recirculating waste heat steam generator, the feed water mass flow is guided on the basis of a specified desired value in order to control the water level in a drum. The method should give a recirculating waste heat steam generator a particularly high degree of efficiency and simultaneously a particularly high level of operational flexibility. For this purpose the thermal input introduced into an evaporator of the pressure stage is used as input variable in the determination of the desired value.

17 Claims, 1 Drawing Sheet

(51) Int. Cl.
*F22B 35/02* (2006.01)
*F22B 1/18* (2006.01)

(52) U.S. Cl.
CPC ............... *F01K 23/10* (2013.01); *F22D 5/26* (2013.01); *Y02E 20/16* (2013.01)

(56) References Cited

U.S. PATENT DOCUMENTS

| | | | |
|---|---|---|---|
| 5,771,846 A | 6/1998 | Ruchti | |
| 7,007,473 B2* | 3/2006 | Nagatani | F01K 23/065 60/615 |
| 7,624,708 B2* | 12/2009 | Butterlin | F22B 35/10 122/447 |
| 7,801,711 B2* | 9/2010 | Hayashi | F22B 35/18 700/288 |
| 7,931,041 B2 | 4/2011 | Karaca | |
| 9,222,373 B2* | 12/2015 | Bruckner | F01K 23/101 |
| 9,291,345 B2* | 3/2016 | Bruckner | F22B 35/10 |
| 2005/0050909 A1* | 3/2005 | Nagatani | F01K 23/065 62/323.1 |
| 2006/0200325 A1* | 9/2006 | Hayashi | F22B 35/18 703/2 |
| 2008/0066695 A1 | 3/2008 | Butterlin et al. | |
| 2009/0121495 A1 | 5/2009 | Mills | |
| 2009/0159018 A1 | 6/2009 | Mehendale | |
| 2009/0322089 A1 | 12/2009 | Mills | |
| 2010/0126433 A1 | 5/2010 | Kozaki | |
| 2010/0288210 A1 | 11/2010 | Bruckner et al. | |
| 2011/0139094 A1* | 6/2011 | Bruckner | F22B 35/10 122/451.1 |
| 2011/0225972 A1 | 9/2011 | Bruckner et al. | |
| 2013/0047938 A1* | 2/2013 | Brodesser | F22B 29/00 122/7 R |
| 2013/0133751 A1* | 5/2013 | Backi | F01K 13/00 137/11 |
| 2014/0109547 A1* | 4/2014 | Bruckner | F22B 35/02 60/39.182 |
| 2015/0184553 A1* | 7/2015 | Akiyama | F01K 23/101 60/778 |

FOREIGN PATENT DOCUMENTS

| | | |
|---|---|---|
| DE | 19510619 A1 | 9/1996 |
| EP | 1614962 A1 | 1/2006 |
| JP | H01210704 A | 8/1989 |
| JP | 2008506087 A | 2/2008 |
| JP | 2009150644 A | 7/2009 |
| JP | 2009300038 A | 12/2009 |
| JP | 2010121916 A | 6/2010 |
| JP | 2011504996 A | 2/2011 |
| JP | 2012508861 A | 4/2012 |

* cited by examiner

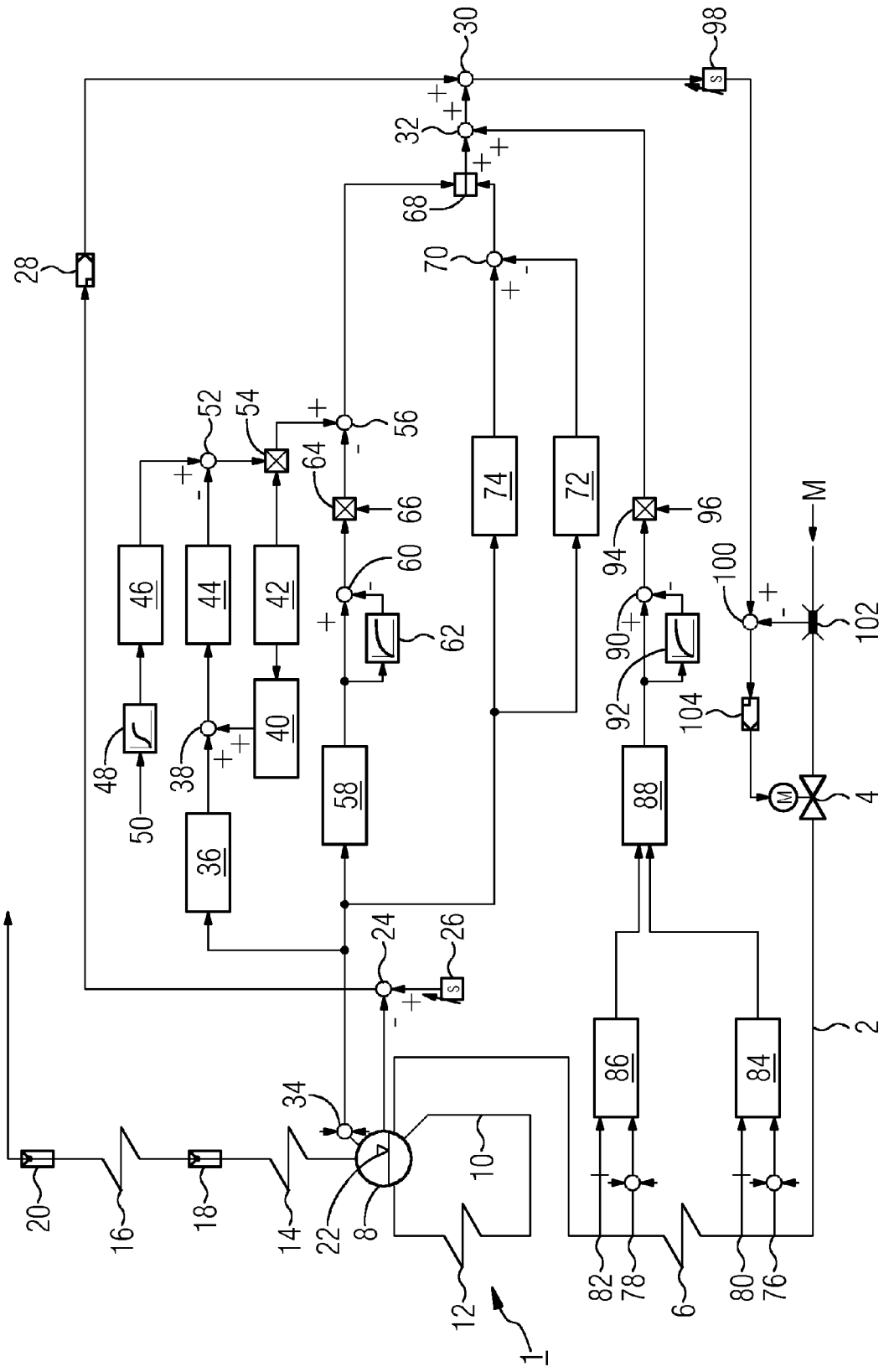

METHOD FOR OPERATING A RECIRCULATING WASTE HEAT STEAM GENERATOR

CROSS REFERENCE TO RELATED APPLICATIONS

This application is the US National Stage of International Application No. PCT/EP2012/059575 filed May 23, 2012, and claims the benefit thereof. The International Application claims the benefit of German Application No. DE 102011076968.4 filed Jun. 6, 2011. All of the applications are incorporated by reference herein in their entirety.

FIELD OF INVENTION

The invention relates to a method for operating a recirculating waste heat steam generator in which, in a pressure stage of the recirculating waste heat steam generator, the feedwater mass flow is managed on the basis of a specified desired value in order to control the water level in a drum.

BACKGROUND

A waste heat steam generator is a heat exchanger that recovers heat from a hot gas flow. Waste heat steam generators are often used in gas and steam turbine plants (combined cycle plants), which are used predominantly for power generation. A modern combined cycle plant usually comprises one to four gas turbines and at least one steam turbine, either each turbine respectively driving a generator (multi-shaft plant) or one gas turbine acting together with the steam turbine on a common shaft to drive a single generator (single-shaft plant). The hot waste gases of the gas turbine are in this case used in the waste heat steam generator for generating steam. The steam is subsequently fed to the steam turbine. Usually, about two thirds of the electrical power is accounted for by the gas turbine and one third is accounted for by the steam process.

By analogy with the various pressure stages of a steam turbine, the waste heat steam generator also comprises a plurality of pressure stages with different thermal states of the water-steam mixture respectively contained. In each of these pressure stages, on its flow path the flow medium passes firstly through economizers, which use residual heat for preheating the flow medium, and subsequently various stages of evaporator and superheater heating surfaces. In the evaporator, the flow medium is evaporated and the steam obtained is heated further in the superheater. In most present-day combined cycle plants, recirculating waste heat steam generators are used in all the pressure stages in which the waste heat steam generator has a central drum that is in connection with all three sections of the steam generator on the water side, the evaporator, the economizer and the superheater. The liquid phase always remains in the drum and is fed continuously to the evaporator via downcomers. Steam bubbles rise up to the surface of the water and are drawn off from the drum at the top. The steam produced is made up by replenishing feedwater from the economizer. Thus, the water level in the drum is kept almost constant.

In recirculating evaporators with a customary drum size, the feedwater flow is today mostly provided by what is known as a three-component control. The desired value for the feedwater mass flow is chosen in dependence on the live steam mass flow. The prime objective of this feedwater control is to maintain the desired water level in the drum. For this reason, the water level in the drum at any given time serves as a corrective controlled variable which, depending on the deviation from the desired value, brings about a corrective change in the feedwater mass flow. On account of the large store of water in the drum (buffer volume), which allows the corrective controller to operate slowly, critical transient processes, such as for example rapid changes in load, can also be handled within limits from the viewpoint of a water level in the drum that fluctuates little and is admissible.

However, modern power generating plants are required on the one hand to deliver high degrees of efficiency, which involves an increase in the steam parameters if only because of higher gas turbine outlet temperatures, and on the other hand to operate as flexibly as possible. Because of the high pressures and temperatures, drums in large boilers have very great wall thicknesses. When there is rapid heating up or cooling down, these great wall thicknesses in turn lead to thermal stresses, which may be as much as the load limit of the material. Thick-walled drums therefore restrict the maximum admissible running-up and running-down gradients of the steam generator. In order to limit the wall thicknesses to an acceptable amount, the drum diameter has to be reduced.

If therefore, on account of more demanding requirements with regard to the steam parameters and the flexibility of the plant, the drum diameter is reduced, the requirements for the feedwater control concept, and consequently also for the filling level control of steam drums in recirculating evaporators, increase. Under some circumstances it may be the case that a slow-acting three-component control that still produces reasonable results with a large buffer volume can no longer be meaningfully used here.

SUMMARY OF THE INVENTION

It is therefore an object herein to provide a method of the aforementioned type that makes a particularly high degree of efficiency possible, with at the same time a particularly high level of operational flexibility of a recirculating waste heat steam generator.

This object is achieved herein by using the thermal power introduced into an evaporator of the pressure stage as an input variable in the determination of the desired value on the basis of which the feedwater mass flow is managed.

Embodiments are based here on the idea that an increase in the level of operational flexibility of a recirculating waste heat steam generator can be achieved with a particularly small drum diameter, owing to efficiency, by suitable control of the filling level of the drum. In particular, it is possible to obtain a level of flexibility that is all the higher, the quicker fluctuations of the water level of the drum can be effectively compensated, and consequently minimized, by a suitable feedwater control.

In order to achieve this, the amount of feedwater should not only be adapted with regard to the water level of the drum when a change in the water level of the drum has already been established, but should already be adapted in advance to likely changes in the water level, in the manner of a predictive control. In this case, the water level in the drum is substantially dependent on how much flow medium is actually evaporated in the evaporator, and accordingly has to be replenished via the economizer. The proportion of steam or water in the flow medium at the evaporator outlet in this case depends on the thermal input into the evaporator. Consequently, the thermal input into the evaporator is suitable as a predictive corrective variable for controlling the water level in the drum. In the determination of the desired value for the feedwater mass flow, the thermal power introduced into the evaporator should therefore be used as an input variable.

In the determination of the thermal power introduced into the evaporator of the pressure stage, the flue gas mass flow and the difference in the specific enthalpy of the flue gas at the inlet and outlet of the evaporator of the pressure stage are advantageously used. The determination of the thermal power introduced into the evaporator therefore takes place by compiling a record of the thermal values of the evaporator on the flue gas side. Values for the flue gas mass flow can be made available here for example from the unit coordination level, since these values are directly dependent on the operating state at any given time of a gas turbine typically provided upstream.

In the determination of the specific enthalpy of the flue gas at the inlet of the evaporator of the pressure stage, the temperature of the flue gas at the inlet of the evaporator of the pressure stage is advantageously used as an input variable. From this temperature, the specific enthalpy can be determined by a simple linear relationship, as long as the composition of the flue gas is known. The temperature may in this case be measured directly by corresponding measuring devices at the evaporator inlet.

In a particularly advantageous refinement, however, in the determination of the temperature of the flue gas at the inlet of the evaporator of the pressure stage, the flue gas temperature at the inlet of the steam generator is used. Such an estimation of the flue gas temperature at the evaporator inlet makes it possible to dispense with expensive measuring devices on the flue gas side. This is made possible by the special property of recirculating steam generators that the flow medium is under saturation conditions throughout, and consequently is not overheated at the evaporator outlet. There is consequently a fall in the number of dependent parameters, since for example possible overheating of the flow medium at the evaporator outlet does not have to be taken into consideration. As a result, in the course of a thermodynamic design review in advance, a parameter map is determined, with the aid of which a characteristic value for the flue gas temperature at the evaporator inlet can be determined on the basis of the flue gas temperature at the steam generator inlet in conjunction with a suitable load signal (advantageously the flue gas mass flow). This makes possible a comparatively error-immune determination of the temperature of the flue gas at the evaporator inlet without an additional measuring device.

The specific enthalpy of the flue gas at the inlet of the evaporator of the pressure stage is advantageously used with a time delay. Such a time delay, which in technical control terms can be achieved by a higher-order time delay element (PTn), allows the time delay with which changes in temperature on the flue gas side are also noticeable for the flow medium in the evaporator to be replicated.

In principle, it is possible also to measure the temperature of the flue gas directly at the outlet of the evaporator. In a particularly advantageous refinement of the method, however, in the determination of the specific enthalpy of the flue gas at the outlet of the evaporator, the saturation temperature of the flow medium is used as an input variable. This likewise makes it possible to dispense with a separate measurement, with correspondingly expensive and complex measuring devices. Instead of a measured variable, here the flue gas temperature is estimated in dependence on the saturation temperature of the flow medium in the evaporator and converted into an associated flue gas enthalpy, likewise as a function of the present composition of the gas. In this case it is assumed that the flue gas temperature at the evaporator outlet is minimally greater than the saturation temperature of the fluid in the evaporator, and this temperature difference likewise becomes less as the load becomes lower.

Irrespective of the type of determination of the temperature on the flue gas side at the evaporator inlet and outlet, the thermal power given off by the flue gas to the evaporator heating surface can be precisely determined by the method described so far. Apart from this overall heat take-up of the evaporator, the enthalpy rise (enthalpy difference) of the flow medium in the evaporator should be additionally used for the determination of the feedwater mass flow, i.e. the enthalpy difference of the flow medium between the inlet and the outlet of the evaporator of the pressure stage is advantageously used as an input variable in the determination of the desired value. This is determined from the enthalpy of the saturated steam (with respect to the measured drum pressure) or the enthalpy measured on the flow medium side at the evaporator inlet.

The latter may in this case be determined by way of a functional conversion of the measured variables of the pressure and temperature. If the enthalpy is determined in this way for the evaporator inlet, a slight subcooling, as there usually is at the evaporator inlet in the case of recirculating systems, can be appropriately taken into consideration in the record of the thermal values. If a separate measurement of the temperature and the pressure at the evaporator inlet is not provided or not possible, the enthalpy of the saturated water (likewise with respect to the measured drum pressure) may also be used to simplify matters. Finally, if the heat offered on the evaporator side is divided by the enthalpy difference on the medium side thus obtained, the required feedwater mass flow that is to be used as a basis for the filling level control is known for every operating state, at least for steady-state load operation.

The measures described so far make it possible to use the deviation of the actual water level of the drum from the specified desired value as a corrective controlled variable of the flow generated by the predictive feedwater mass flow determination. However, it must be noted here that, in spite of the improvements already described, an intervention by this corrective controller should still be carried out very slowly and with low controller gain for reasons of controller stability. Particularly strong temporary deviations from the specified desired value that occur on account of physical mechanisms as a result of a highly transient operating mode of the waste heat boiler still cannot always be avoided under some circumstances for this corrective control circuit. In order to protect the drum reliably from overrunning or idling, further optimizing measures of the feedwater desired value determination should advantageously be taken to provide stabilization and are described below.

If, when transient processes occur, the system pressure, and consequently simultaneously the saturation temperature of the fluid in the evaporator, change, the temperature of the material of the evaporator tubes likewise changes. As a result, thermal energy is stored in the tube walls or released from the tube walls. Depending on the direction of the change in pressure, there is accordingly temporarily more heat (a drop in pressure) or less heat (an increase in pressure), compared with the recorded flue gas heat, available for the evaporation process of the flow medium. With a specified enthalpy rise of the flow medium in the evaporator (the medium completely passes through the two-phase region), this not inconsiderable influence should therefore be taken into consideration in the control concept for the calculation of the required feedwater mass flow in advance.

For this purpose, the time-delayed saturation temperature of the flow medium in the pressure stage is advantageously used as an input variable in the determination of the desired value. This is so because a first-order differentiating element (DT1 element) allows this physical effect to be reproduced in technical control terms. It is presupposed as an approximation that, when there is a modification of the system pressure, the change over time both of the temperature of the flow medium and that of the tube wall are identical. Accordingly, the saturation temperature of the flow medium calculated from the measured drum pressure is used as an input of the differential element.

If the output of this differential element is multiplied by the mass of the evaporator tubes as a whole, including all of the pipelines associated with the evaporator system (such as for example downcomers and risers, inlet and outlet headers and the drum itself) and the specific heat capacity of the evaporator material, the amounts of heat stored in the tube wall or released from it can be quantified. The choice of a suitable time constant of this differentiating element allows the behavior over time of the described storing effects to be replicated relatively accurately, so that this additional effect of the storing or releasing of the heat of the metal masses that is based on transient processes can be calculated directly. For further consideration, the heat flow corrective value determined in this way is subtracted from the total heat take-up of the evaporator on the flue gas side.

In a further advantageous refinement, the time-delayed density of the flow medium in the pressure stage is used as an input variable in the determination of the desired value. This is so because, when transient processes occur in the water/steam circuit, values for the thermodynamic state, such as for example pressure and temperature, also change. These changes are inevitably accompanied by changes in the specific volume or the density of the flow medium in every heating surface of the waste heat steam generator. If, for example, on account of a load change, the specific volume of the flow medium in a heating surface decreases (i.e. the density increases), this surface can temporarily take up more fluid in terms of mass. Conversely, when there is a falling density, the heating surface can take up less fluid. This effect is particularly pronounced in the case of heating surfaces with a high proportion of unevaporated flow medium, i.e., in the case of recirculating steam generators, in particular in the economizer heating surfaces that should be taken into consideration for the optimization of the filling level control of the drum. If, as described, fluid-side storing and releasing effects occur here during transient operation, these directly result in mass flow fluctuations at the economizer outlet, which is inevitably accompanied by a fluctuating water level of the drum. Suitable feedwater management allows these fluctuations to be effectively compensated, and consequently deviations of the water level of the drum from the specified desired value to be effectively reduced.

Additional measurements of the temperature and pressure at the inlet of the first economizer heating surface and at the outlet of the last economizer heating surface allow the fluid density at these locations to be determined. A representative density average can be determined by a suitable conversion. A change in this density average is consequently an indicator of fluid-side storing and releasing effects, which can be quantitatively detected by a further first-order differentiating element (DT1). If a suitable gain (preferably the complete volume of the economizer heating surfaces) and a suitable time constant (preferably half the transit time of the flow medium through the economizer heating surfaces (load-dependent)) is chosen for this differential element, the correction signal thus generated compensates for the fluid-side storing effects in the economizer. In this case, the correction signal determined in this way should be superposed additively onto the feedwater mass flow calculated from the record of the thermal values. In this way, fluctuations of the water level of the drum can be reduced further.

The restriction of the density measurements to the economizer is attributable to the realization that fluctuations of the average density in the evaporator itself (for example through changes of the inlet subcooling) do not have any appreciable effects on the water level of the drum. This is so because fluctuations in the average density balance out in the recirculating systems as a result of different numbers of circulations in the evaporator system, so that the water level of the drum remains unaffected by this. Therefore, a separate consideration of changes in density in the evaporator is not required for optimized filling level control.

In an advantageous refinement, a recirculating waste heat steam generator operated by the method described above is used in a gas and steam turbine power plant.

The advantages achieved herein are, in particular, that deviations of the filling level of the drum from the specified desired value are restricted to a minimum by a predictive feedwater desired value determination in a recirculating waste heat steam generator, so that the maximum possible load changing rates of such systems are increased considerably. In fact, such a method makes it possible to improve the plant dynamics, which cannot be implemented with reduced drum diameters when using filling level control on the basis of the current state of the art. In this respect, the embodiments herein represent a significant improvement in the present-day filling level control.

BRIEF DESCRIPTION OF THE DRAWINGS

Embodiments of the invention are explained in more detail on the basis of a drawing.

The FIGURE shows a schematic representation of a pressure stage of a recirculating waste heat steam generator with a control circuit based on an embodiment of the present method.

DETAILED DESCRIPTION

Of the recirculating waste heat steam generator 1, only a single pressure stage is shown in the schematic representation of the FIGURE. The method described below may be used in any pressure stage. Furthermore, the FIGURE only shows the interconnection of the individual heating surfaces on the flow medium side, the interconnection on the flue gas side not being represented.

Flow medium M typically flows from a condensate preheater not shown any more specifically into the flow path 2 of the recirculating waste heat steam generator 1. The mass flow of the flow medium M is controlled by a feedwater control valve 4. The feedwater pump of the circuit is not represented any more specifically. Firstly, the flow medium M enters the economizer 6, which is arranged on the flue gas side, in the coldest region. With respect to the economizer 6 and also with respect to the further heating surfaces still to be described, the representation in the FIGURE may also apply to a plurality of heating surfaces that are arranged in series or in parallel.

After the preheating in the economizer 6, the flow medium M flows into the drum 8. From here, liquid flow medium M flows via downcomers 10 into the evaporator 12, where it is partially evaporated by the heat transfer from the flue gas. After flowing through the evaporator 12, the flow medium M is returned into the drum 8, where the non-evaporated, liquid part remains and is fed once again to the evaporator 12, while the evaporated part is carried away out of the drum 8 in the upward direction. The evaporated part of the flow medium M is replaced by the flow medium M fed in via the economizers 6, so that in the ideal case a constant filling level is established in the drum 8.

The FIGURE shows a natural-circulation waste heat recovery boiler, which does not need an additional circulating pump in the circulation of the evaporator 12. The embodiment described below may, however, also be used in a forced-circulation waste heat recovery boiler.

The evaporated flow medium M from the drum 8 enters the superheaters 14, 16, arranged downstream of which there is respectively an injection device 18, 20 for temperature control. Here, the flow medium M is superheated and brought to the desired outlet temperature, and subsequently allowed to expand in a steam turbine not shown any more specifically. From there, it is fed to a condenser and fed once again to the flow path 8 via the condensate preheater. When transient load processes occur, the filling level in the drum 8 may fluctuate. Since, on the one hand, small drum wall thicknesses are preferred because of a particularly high level of plant flexibility but, on the other hand, particularly high steam parameters are desirable on account of a high degree of efficiency, the drum 8 should be designed with an inside diameter that is as small as possible. However, this requires a minimization of the filling level fluctuations in the drum 8, which is ensured by the control presented below.

A filling level measuring device 22 measures the filling level in the drum 8 and passes the determined filling level at any given time as a signal to a subtracting element 24. Here, the filling level at the given time in the drum 8 is subtracted from the value set at a filling level desired-value encoder 26, so that the deviation of the filling level from the desired value is present at the output of the subtracting element 24. The output of the subtracting element 24 is connected to a controller element 28, which may be designed as a P controller or PI controller, i.e. outputs a signal (in the latter case proportional to the deviation) when there is a sufficiently great deviation of the filling level from the desired value.

In the adding elements 30, 32, further correction signals are added to the signal already determined by the deviation from the desired value of the filling level of the drum 8, with the intention of making a predictive control of the amount of flow medium M delivered by the feed pump 4 possible, so that deviations of the filling level of the drum 8 from the desired value are already avoided or minimized in advance.

For this purpose, firstly the pressure in the drum 8 is measured by a pressure measuring device 34 and presented to the control. From the pressure, the saturated steam temperature is determined in a calculating element 36. To this there is added in an adding element 38 the temperature difference at what is known as the pinch point, which is determined in a calculating element 40 and precisely represents the temperature difference between the saturated flow medium and the flue gas temperature at the evaporator outlet on the gas side, so that the flue gas temperature at the outlet of the evaporator 12 is obtained here. Since the temperature difference at the pinch point is load-dependent, the calculating element 40 receives as an input signal the flue gas mass flow from an encoder element 42. This flow may be measured or provided by the unit coordination level.

With a known composition of the flue gas, the calculating element 44 calculates from the temperature of the flue gas mass flow at the evaporator outlet on the gas side that is present at the output of the adding element 38 the specific flue gas enthalpy at the evaporator outlet on the gas side. By contrast, the specific flue gas enthalpy at the evaporator inlet on the gas side is calculated in the calculating element 46 from the measured or estimated flue gas temperature at the evaporator inlet 50 on the gas side, delayed in the PTn delay element 48. The estimation is especially possible in the case of recirculating steam generators, the flue gas temperature at the evaporator inlet being determined from the flue gas temperature at the inlet of the waste heat recirculating steam generator 1 on the basis of a parameter map for a given load. The parameter map is determined in advance on the basis of measurements, but in an alternative embodiment may also be determined by suitable calculations.

The specific enthalpies determined at the inlet and outlet of the evaporator 12, from the calculating elements 46 and 44, respectively, are subtracted from one another in the subtracting element 52. The difference is passed to a multiplying element 54, where it is multiplied by the flue gas mass flow from the encoder element 42. Consequently, the thermal power given off by the flue gas to the evaporator 12 is present at the output of the multiplying element 54.

From this there is also subtracted in the subtracting element 56 the amount of heat that is not given off to the flow medium M, but to the components of the evaporator 6. This is determined from the saturation temperature calculated in the calculating element 58, the pressure measuring device 34 serving in turn as the input. From the output signal of the calculating element 58, the output signal of the calculating element 58, delayed in a PT1 delay element 62, is subtracted in the subtracting element 60. As a result, when there is a sudden change in the pressure, there is firstly a signal at the output of the subtracting element 60, which decreases with time and models the heating up or cooling down of the tube walls of the evaporator 12. The output signal is multiplied in a multiplying element 64 by a characteristic number 66 that is characteristic of the mass of the components of the evaporator 12 taking up the heat, and is subtractively passed to the subtracting element 56.

This signal that is present in the subtracting element 56 and is characteristic of the heat offered to the flow medium M in the evaporator 12 is divided in a dividing element 68 by the evaporation enthalpy of the flow medium M in the evaporator 12, which is formed in the subtracting element 70 as the difference from the enthalpy of the saturated water and of the saturated steam determined in the calculating elements 72 and 74, respectively. Serving respectively as the input of the calculating elements 72 and 74 is the pressure measuring device 34. In an improved embodiment, which however is not shown in the FIGURE, the pressure and temperature for the determination of the enthalpy at the evaporator inlet are measured directly, but this requires additional measuring devices.

The quotient thus determined in the dividing element 68 is an indicator of future changes in the filling level in the drum 8 and is fed to the adding element 32. Storing and releasing effects on the flow medium side, which are caused by changes in density of the flow medium M in the economizer 6 and are added in the adding element 32, have a further important influence on the filling level.

These storing and releasing effects are determined by measuring the pressure and temperature of the flow medium M upstream and downstream of the economizer 6 in the pressure measuring devices 76 and 78 and temperature measuring devices 80 and 82, respectively. From their input signals, the density at the economizer inlet is determined in the calculating element 84 and the density at the economizer outlet is determined in the calculating element 86. From their signals, the calculating unit 88 forms a characteristic average density of the flow medium in the economizer 6. Here, too, the output signal of the calculating element 88, delayed in a PT1 delay element 92, is subtracted from the output signal of the calculating element 88 in the subtracting element 90. As a result, when there is a sudden change in the density, there is firstly a signal at the output of the subtracting element 90, which decreases with time and models restoring and releasing of flow medium into the economizer 6. The output signal is multiplied in a multiplying element 94 by a characteristic number 96 that is characteristic of the volume of the heating surfaces of the economizer 6, and is passed to the adding element 32.

These corrective variables are passed via the adding element 30 to the filling level deviation signal from the control element 28 and entered into an encoder element 98, where a desired value for the feedwater mass flow is prepared from them. This desired value is passed to a subtracting element 100, in which the mass flow of the flow medium M measured in a mass flow measuring device 102 upstream of the feedwater control valve 4 on the flow medium side is subtracted. The deviation signal is fed to a PI control element 104, which corrects the flow rate of the feedwater control valve 4 when there is a corresponding deviation.

The control presented and the control method presented make it possible by minimizing filling level fluctuations in the drum 8 to ensure a high level of operational flexibility even in recirculating waste heat steam generators 1 with a small drum 8, and consequently high possible steam parameters and high levels of efficiency.

The invention claimed is:

1. A method for operating a recirculating waste heat steam generator comprising,
   determining a specified desired value,
   managing the feedwater mass flow in a pressure stage of the recirculating waste heat steam generator on the basis of the specified desired value in order to control the water level in a drum,
   wherein the thermal power introduced into an evaporator of the pressure stage is used as an input variable in the determination of the desired value,
   wherein, in the determination of the thermal power introduced into the evaporator of the pressure stage, a flue gas mass flow and a difference in the specific enthalpy of the flue gas at an inlet and outlet of the evaporator of the pressure stage are used, and
   wherein, in the determination of the specific enthalpy of the flue gas at the outlet of the evaporator, a saturation temperature of the flow medium is used as an input variable.

2. The method as claimed in claim 1, wherein the specific enthalpy of the flue gas at the inlet of the evaporator of the pressure stage is used with a time delay.

3. The method as claimed in claim 1, wherein an enthalpy difference of the flow medium between the inlet and the outlet of the evaporator of the pressure stage is used as an input variable in the determination of the desired value.

4. The method as claimed in claim 1, wherein a time-delayed saturation temperature of the flow medium in the pressure stage is used as an input variable in the determination of the desired value.

5. The method as claimed in claim 1, wherein a time-delayed density of the flow medium in the pressure stage is used as an input variable in the determination of the desired value.

6. A recirculating waste heat steam generator adapted to carry out the method as claimed in claim 1.

7. A gas and steam turbine power plant with a recirculating waste heat steam generator as claimed in claim 6.

8. The method as claimed in claim 1, wherein, in the determination of the specific enthalpy of the flue gas at the inlet of the evaporator of the pressure stage, a temperature of the flue gas at the inlet of the evaporator of the pressure stage is used as an input variable.

9. The method as claimed in claim 8, wherein, in the determination of the temperature of the flue gas at the inlet of the evaporator of the pressure stage, a flue gas temperature at a flue gas inlet of the recirculating waste heat steam generator that is located upstream of the inlet of the evaporator is used as a basis to estimate the temperature of the flue gas at the inlet of the evaporator of the pressure stage.

10. The method as claimed in claim 9, wherein the flue gas temperature at a flue gas inlet of the recirculating waste heat steam generator is used together with a predetermined parameter map to estimate the temperature of the flue gas at the inlet of the evaporator of the pressure stage.

11. A method for operating a recirculating waste heat steam generator comprising,
    determining a specified desired value,
    managing the feedwater mass flow in a pressure stage of the recirculating waste heat steam generator on the basis of the specified desired value in order to control the water level in a drum,
    wherein the thermal power introduced into an evaporator of the pressure stage is used as an input variable in the determination of the desired value, and
    wherein a time-delayed saturation temperature of the flow medium in the pressure stage is used as an input variable in the determination of the desired value.

12. The method as claimed in claim 11, wherein the time-delayed saturation temperature of the flow medium in the pressure stage is of the flow medium at an outlet of the evaporator.

13. The method as claimed in claim 11, wherein, in the determination of the thermal power introduced into the evaporator of the pressure stage, a flue gas mass flow and a difference in the specific enthalpy of the flue gas at an inlet and outlet of the evaporator of the pressure stage are used, and wherein, in the determination of the specific enthalpy of the flue gas at an inlet of the evaporator of the pressure stage, a temperature of the flue gas at the inlet of the evaporator of the pressure stage is used as an input variable.

14. A method for operating a recirculating waste heat steam generator comprising,
    determining a specified desired value,
    managing the feedwater mass flow in a pressure stage of the recirculating waste heat steam generator on the basis of the specified desired value in order to control the water level in a drum,
    wherein the thermal power introduced into an evaporator of the pressure stage is used as an input variable in the determination of the desired value, and
    wherein a time-delayed density of the flow medium in the pressure stage is used as an input variable in the determination of the desired value.

15. The method as claimed in claim 14, wherein the time-delayed density is of the flow medium at one or both of an inlet and an outlet of an economizer of the recirculating waste heat steam generator.

16. The method as claimed in claim 14, wherein, in the determination of the thermal power introduced into the evaporator of the pressure stage, a flue gas mass flow and a difference in the specific enthalpy of the flue gas at an inlet and outlet of the evaporator of the pressure stage are used, and wherein, in the determination of the specific enthalpy of the flue gas at the outlet of the evaporator, a saturation temperature of the flow medium is used as an input variable.

17. The method as claimed in claim 14, wherein, in the determination of the thermal power introduced into the evaporator of the pressure stage, a flue gas mass flow and a difference in the specific enthalpy of the flue gas at an inlet and outlet of the evaporator of the pressure stage are used, and wherein, in the determination of the specific enthalpy of the flue gas at the inlet of the evaporator of the pressure stage, a temperature of the flue gas at the inlet of the evaporator of the pressure stage is used as an input variable.

\* \* \* \* \*